United States Patent
Frasher et al.

(10) Patent No.: US 8,060,395 B1
(45) Date of Patent: Nov. 15, 2011

(54) METHOD AND SYSTEM FOR PRIORITY-BASED APPOINTMENT SCHEDULING

(75) Inventors: Thomas A. Frasher, Sunnyvale, CA (US); Todd M. Fitch, Santa Clara, CA (US); Steven A. Sholtis, El Dorado Hills, CA (US)

(73) Assignee: Intuit Inc., Mountain View, CA (US)

( * ) Notice: Subject to any disclaimer, the term of this patent is extended or adjusted under 35 U.S.C. 154(b) by 1171 days.

(21) Appl. No.: 11/769,997

(22) Filed: Jun. 28, 2007

(51) Int. Cl.
*G06F 9/46* (2006.01)
(52) U.S. Cl. ...................................... 705/7.18
(58) Field of Classification Search ............. 705/9, 7.18
See application file for complete search history.

(56) References Cited

U.S. PATENT DOCUMENTS

| | | | |
|---|---|---|---|
| 6,016,478 A | 1/2000 | Zhang et al. | |
| 6,216,110 B1 | 4/2001 | Silverberg | |
| 6,310,947 B1 | 10/2001 | Polcyn | |
| 6,345,260 B1 * | 2/2002 | Cummings et al. | 705/8 |
| 6,675,356 B1 | 1/2004 | Marshall | |
| 6,937,993 B1 * | 8/2005 | Gabbita et al. | 705/8 |
| 6,961,418 B1 | 11/2005 | Thygeson et al. | |
| 7,188,073 B1 * | 3/2007 | Tam et al. | 705/9 |
| 7,620,562 B2 * | 11/2009 | Henry et al. | 705/9 |
| 7,640,507 B2 * | 12/2009 | Bedingfield, Sr. | 715/752 |
| 7,664,667 B1 * | 2/2010 | Ruppelt et al. | 705/8 |
| 2001/0011225 A1 * | 8/2001 | O'Connor et al. | 705/9 |
| 2003/0023463 A1 | 1/2003 | Dombroski et al. | |
| 2003/0130882 A1 | 7/2003 | Shuttleworth et al. | |
| 2005/0228697 A1 | 10/2005 | Funahashi et al. | |
| 2006/0143060 A1 * | 6/2006 | Conry et al. | 705/8 |
| 2006/0195365 A1 | 8/2006 | Karabetsos | |
| 2006/0271399 A1 | 11/2006 | Robson, Sr. et al. | |
| 2007/0043687 A1 | 2/2007 | Bodart et al. | |
| 2007/0282654 A1 * | 12/2007 | Sarkar | 705/8 |

\* cited by examiner

*Primary Examiner* — Romain Jeanty
(74) *Attorney, Agent, or Firm* — Gunnison, McKay & Hodgson, L.L.P.; Philip McKay

(57) ABSTRACT

A priority-based scheduling service may schedule appointments between service providers and service consumers by assigning a priority to an appointment request based on one or more factors. The scheduling service may take into consideration the history of the service consumer and the purpose or reason for the appointment request. In addition, preferences indicated by the service provider and service consumer may be taken into consideration by the scheduling service. A prioritized appointment request may be scheduled dependent upon how high or low a priority has been assigned to the request. The scheduling service may apply rules during the prioritizing and scheduling processes. Rules may be configured by the service providers. Once the appointment has been scheduled by the scheduling service, notification may be sent to the service provider and service consumer. Communication between the scheduling service, service providers and service consumers may be accomplished via a communications network.

30 Claims, 9 Drawing Sheets

METHOD AND SYSTEM FOR PRIORITY-BASED APPOINTMENT SCHEDULING

BACKGROUND

Scheduling appointment times for a service provider is typically a manual process. A service provider may utilize scheduling software to keep track of appointments. Upon being contacted by a service consumer, an employee of the service provider may enter an appointment in the scheduling software for a time agreed upon with the consumer and subject to availability. In many service industries, the needs of some consumers may be more urgent than others. For this reason and others, a service provider may need to prioritize appointments in regards to one another. When a service consumer makes an appointment with a service provider, the service provider typically needs to know the reason for the appointment in order to evaluate its priority before an appointment day and time can be determined. For example, when a patient (service consumer) makes an appointment with a health care provider (service provider), the health care provider may need to know the patient's symptoms and health history to complete the scheduling process. Some medical conditions require more immediate attention than others and therefore may receive a higher priority during the scheduling process. If the priority of an appointment request is high and there are no available time slots in the near future, other appointments with a lower priority may need to be shifted to another time in order to accommodate the request with the higher priority. The process of evaluating and comparing priorities of appointments, rescheduling, notifying consumers of changes, etc. may be very complex.

If a consumer's appointment time is changed as the result of a higher priority appointment, the provider needs to notify the consumer of the change to his appointment time. The provider may have contact information for the consumer, but the consumer's contact information may be incomplete or outdated. Generally, the process of contacting consumers regarding changed appointment times may be difficult and time consuming for the service provider.

SUMMARY

Various embodiments of a method and system for a priority-based appointment scheduling service to schedule prioritized appointments between service consumers and service providers are disclosed. According to one embodiment, a computer system implements a scheduling service. The scheduling service may be configured to receive scheduling requests for one or more service providers. In some embodiments, the scheduling service may be a network-based service (e.g., accessible over the Internet).

In some embodiments, the scheduling service may receive scheduling requests for one or more service providers. For example, a service consumer may request an appointment with a service provider. The schedule request may include information that identifies the service consumer making the request. The request may also identify one or more service providers. In addition, other information may be included in the request, such as a reason for the appointment, or a condition description. The request may be evaluated by the scheduling service and the scheduling service may assign a priority to the request.

In some embodiments the scheduling service may access the service provider's existing schedule information and priority information associated with existing appointments. The scheduling service may determine an appointment time for the scheduling request by evaluating the service provider's schedule information and the priority assigned to the scheduling request.

When the prioritized appointment request has been determined by the scheduling service, notification of the appointment information may be sent to the service provider and the service consumer using any of a number of possible methods, including email, text messaging, instant messaging, networked calendaring application and telephone and other methods. Notification may be sent to any number of possible devices, including personal computers, cell phones, PDAs, and other devices.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words, "include", "including", and "includes" mean including, but not limited to.

DETAILED DESCRIPTION OF EMBODIMENTS

A priority-based scheduling service may schedule appointments between service consumers and service providers. In some embodiments, the system may be implemented as a network-based or web-based system and connected to service consumers and service providers via network (e.g. public Internet). The system may assign a priority to an appointment request and may also access a service provider's current schedule information.

In some embodiments, the scheduling service may access history information related to a consumer. The consumer's history, related to a service, may indicate a higher priority or lower priority when scheduling an appointment.

In some embodiments, the scheduling service may utilize a set of scheduling rules, applied during the scheduling process. The rules may be configured by the service provider and used by the scheduling service in the determination of the schedule request priority and appointment time. The scheduling service may be configured to apply different sets of rules for different service providers.

In some embodiments, the scheduling service may take into consideration preferences configured by the service provider and/or the service consumer. Provider preferences may include information about how and when the scheduling service should prioritize appointments. Consumer preferences may include preferred appointment times and methods of contact, for example email, text messaging or telephone. Preferences may include other information. The scheduling service may be configured to utilize different sets of preferences associated to providers and consumers.

The system may schedule the request dependent on the priority of the request and the current service provider schedule information. Once the appointment has been scheduled, the scheduling service may send notification of the priority-based appointment to the service provider and service consumer.

Figure 1:
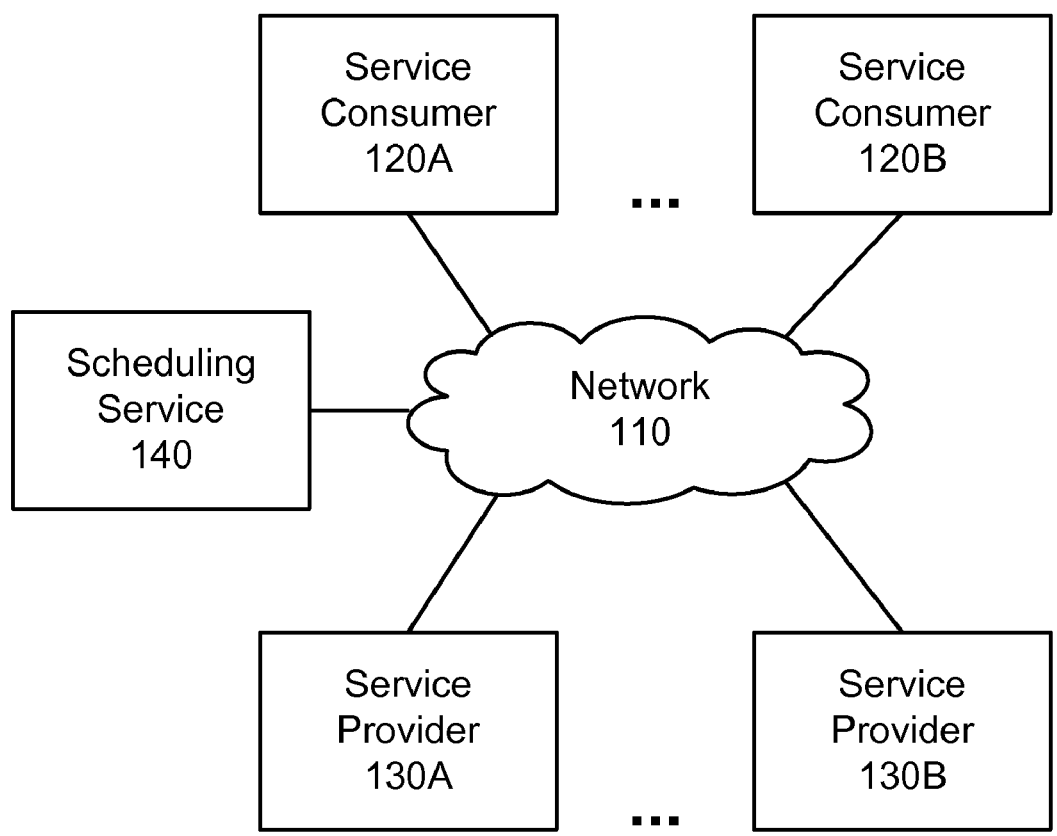
FIG. 1 is a block diagram that illustrates a system including a scheduling service coupled to a network and various service providers and consumers, according to an embodiment.

FIG. 1 is a block diagram illustrating one embodiment of a scheduling service system. The system includes scheduling service 140, configured to schedule priority-based appointments between consumers and providers, all communicating via network 110.

The term "consumer", as used herein, may refer generally to any user of service consumer system 120. Consumers typically require the services of a provider on an appointment basis. The term "provider", as used herein, may refer generally to any user that provides a service on an appointment basis and utilizes service provider system 130. For example, a patient (consumer) utilizing service consumer system 120A may access scheduling service 140 to schedule a priority-based appointment with a health care provider (provider) utilizing service provider system 130A. In another example, a small business owner (consumer) utilizing service consumer system 120B may access scheduling service 140 to schedule a priority-based appointment with an accountant (provider) utilizing service provider system 130B.

Service consumer 120 may be implemented as one of many possible devices and applications, and utilize communication channels to initiate a schedule request and receive appointment notifications. An additional description of devices, applications and communication channels can be found below in the description of FIG. 7.

In one example, a consumer may initiate a schedule request by utilizing a web browser on a personal computer connected to network 110. In a web-based embodiment, one or more web pages may be presented to service consumer 120 via a suitable version of Hypertext Transport Protocol (HTTP) or another suitable transport protocol. Upon receipt, the web pages or other content may be rendered by a suitable browser or other interface application (e.g., a version of Internet Explorer™, Mozilla Firefox, or another type of browser) for display by service consumer 120. In some implementations, web-based content displayed by service consumer 120 may include input features such as fillable forms, radio buttons and/or other interactive features through which the consumer may specify input data, such as a desired provider and/or a desired appointment time and a reason for the schedule request. The consumer may choose a specific service provider 130 from a menu or a list displayed by service consumer 120. In one implementation, the web page may provide a menu of possible appointment reasons or conditions for the consumer to select. The service consumer 120 may submit the schedule request to the scheduling service 140 and the scheduling service 140 may receive the schedule request and respond with an appointment notification. For additional description of the scheduling service process 140, see the description of FIG. 2 below.

In some cases, service providers 130 may utilize an appointment scheduling system locally or may utilize a network-based appointment scheduling system remotely located and accessible over network 110. Service providers 130 utilize an appointment scheduling system to manage and track appointments with consumers. Providers may interact with their scheduling system for the purpose of viewing appointments, setting available appointment times, changing appointments, deleting appointments and performing other tasks.

In some cases, schedule information for a service provider 130 may have associated priority information. In other words, each appointment scheduled in the service provider 130 scheduling system may have an associated priority. In some embodiments, scheduling service 140 interacts with a service provider 130 appointment scheduling system. Scheduling service 140 may be configured to access service provider 130 scheduling system to access appointment information, add appointments, change appointments and remove appointments. Scheduling service 140 may perform other tasks in the service provider 130 scheduling system. In some cases, service provider 130 may interact with scheduling service 140 to set preferences, establish rules, initiate schedule change requests and perform other tasks. For example, service provider 130 may utilize scheduling service 140 to establish a preferred method of communication between service provider 130 and scheduling service 140. In another example, service provider 130 may establish preferred days and times for appointments. In some cases, service provider 130 may have the capability to configure rules utilized by scheduling service 140. Rules are used by providers for the purpose of assigning priorities to schedule requests and scheduling appointments. For example, a health care provider may utilize service provider 130 to access scheduling service 140 in order to establish rules designating scheduling priorities for patient conditions. Some patients with certain conditions require a more urgent scheduling priority than other patients with other conditions. Service provider 130 may be implemented as any of many possible devices for interacting with scheduling service 140, including workstations, servers, laptops, cell phones, personal digital assistants and other devices. See the description for FIG. 7 for further description of such devices.

In various embodiments, scheduling service 140 may schedule priority-based appointments between service provider 130 and service consumer 120 and send notification of the appointments to service provider 130 and service consumer 120. In some embodiments, the scheduling service 140 methods described herein may be implemented as a network based or web-based service, hosted on a scheduling service server 140. In other embodiments, scheduling service 140 may be implemented as a stand-alone network based service. In other embodiments, the methods described herein may be hosted on a healthcare-management server.

Network 110 may be configured to allow data to be exchanged between scheduling service 140 and other computing systems attached to network 110, such as service providers 130, and/or service consumers 120. Network 110 may correspond to various methods of communication between a user and an entity and may include, but are not limited to communication via telephone, fax, email, real-time messages (e.g., instant messages), text messages, voice messages, and electronic documents (e.g., email attachments or file transfers). In general, network 110 may represent any method that a user and an entity may utilize to communicate with each other. While network 110 may be illustrated in a generalized manner, one of ordinary skill in the art will recognize that network 110 is meant to be representative of a complete communication path between scheduling service 140, service provider 130 and service consumer 120 in accordance with the specific type of communication channel. For example, network 110 may represent an email communication channel including various intermediate destinations and/or systems such as email clients, email servers, and/or communication networks (e.g., the Internet). In another example, a communications channel may include one or more telecommunications networks as well as various network devices including circuits, switches, routers and/or gateways. In other embodiments, network interface 110 may allow data to be exchanged between nodes of scheduling service 140. In various embodiments, network 110 may support communication via wired or wireless general data networks, such as any suitable type of network, such as the Internet and/or an Ethernet LAN; via telecommunications/telephony networks such as analog voice networks or digital fiber communications networks; via storage area networks such as Fibre Channel SANs, or via any other suitable type of network and/or protocol.

Figure 2:
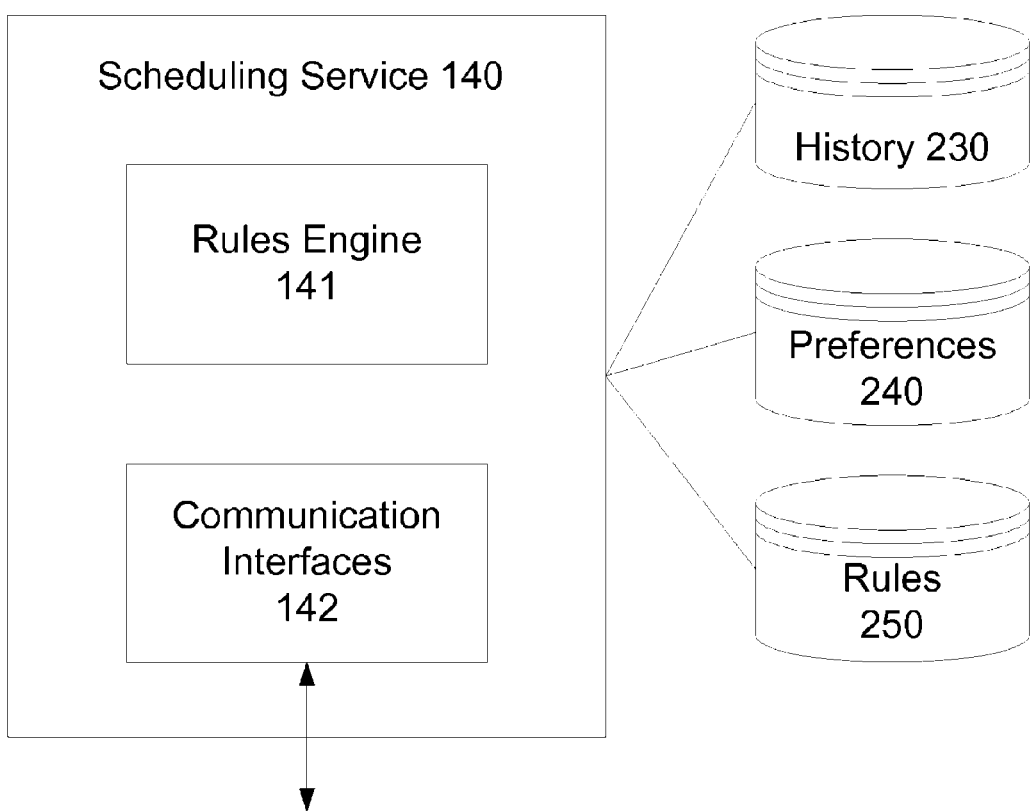
FIG. 2 is a block diagram that illustrates a scheduling service, according to an embodiment.

FIG. 2 is a block diagram illustrating one embodiment of priority-based scheduling service 140. In various embodiments, the functionality of priority-based scheduling service 140 may be implemented within an application, configured to run on a system, such as a computer system 900 (see, e.g., FIG. 9). In various embodiments, system 140 may be a computer system such as a desktop or laptop computer. In other embodiments, system 140 may be a server configured to service requests from clients, such as a web server, application server, and/or database server. In general, system 140 may be any system capable of running an application, such as a priority-based scheduling service 140.

In some embodiments scheduling service 140 may be implemented as a network based or web based service. Scheduling service 140 may interact with a web server and/or utilize a framework such J2EE™, .NET™ or another framework. In some embodiments, scheduling service 140 may be implemented as a stand-alone network service and communicate with service provider 130 and service consumer 120 via network 110. In other embodiments, scheduling service 140 may be coupled with a healthcare management system as further described below.

Scheduling service 140 may be implemented by any suitable technique for providing computational functionality. Functional components such as a rules engine 141, communication interfaces 142 and other components may be implemented as program instructions that may be stored via a computer-accessible medium and executed by one or more processors. In other embodiments, all or portions of scheduling service 140 may be implemented by dedicated hardware devices as hardwired or embedded computing functionality. Scheduling service 140 may be implemented as a standalone program or process capable of executing within an operating system (such as Microsoft Windows™, Apple Macintosh™ OS, Linux/Unix, or other operating system environment) independent of other applications, programs, or processes. For example, scheduling service 140 may be implemented in a programming language such as C or C++ and compiled into an executable code module, or implemented in a scripting language that may be interpreted at application runtime.

In another embodiment, scheduling service 140 may be implemented as a web-based application interacting with service provider 130 and service consumer 120 via a network 110. In various embodiments, network 110 may correspond to the public Internet, a private network, internal to an enterprise (e.g., an intranet), or a combination of the two. Scheduling service 140 may be implemented using web-based application implementation technologies such as Hypertext Markup Language (HTML), Java™, Javascript, Perl, Common Gateway Interface (CGI), web service technologies such as .NET™, eXtensible Markup Language (XML), Simple Object Access Protocol (SOAP), Web Services Description Language (WSDL), etc. or other suitable technologies for providing application functionality to users via network 110. The functionality of scheduling service 140 may also be integrated within other applications in some embodiments, such as healthcare management system.

Scheduling service 140 may accept a schedule request as input. The schedule request may be initiated by service consumer 120, or may be initiated by service provider 130 on behalf of a service consumer 120. The schedule request typically includes information that identifies a consumer and the provider with whom consumer would like to schedule an appointment. Alternatively, the schedule request may include a specialty description (e.g. cardiologist) and the scheduling service may be configured to select a provider whose services are in the area of specialization identified in the schedule request. The schedule request may include a preferred appointment day and time and further may include information that describes a reason for the schedule request. For example, a patient utilizing service consumer 120 may request an appointment for an annual physical with a health care provider; the annual physical would be the reason for the schedule request.

In some embodiments, scheduling service 140 may be configured to assign a priority to the schedule request. A schedule request "priority" may be a value assigned to a schedule request indicating the urgency of the request. Some scheduling requests dictate a higher priority than others. For example, a patient with chest pains may be assigned a higher scheduling priority (e.g., by scheduling service 140) than a patient requesting an appointment for an annual physical. The priority assigned by the scheduling service 140 may be dependent upon several factors, including the reason for the request, the length of time a consumer has waited for an appointment, the history 230 of the consumer and rules 250 which may have been configured by the provider. (See below for a description of service provider history and rules.)

In some embodiments, scheduling service 140 may access and evaluate service consumer history 230 in the process of assigning a priority to a schedule request. For example, a consumer may be a patient seeking an appointment with health care provider and service consumer history 230 may be patient health history. In some embodiments, history 230 may be patient health history, stored on a computer accessible medium in a digital format. History 230 is typically accessed on a computer or over a network 110. History 230 may be made up of health information from many locations and sources including electronic medical records. History 230 may include information relating to current or historical health history, medical conditions and medical tests of a consumer. History 230 may contain information about medical referrals, medical treatments, medications and their application and non-clinical administrative information.

History 230 may be located in several possible locations. For example, history 230 may be located on service consumer 120 and sent to scheduling service 140 along with the schedule request. In another example, history 230 may be located in a history database multiple consumers on a network server external to both the service consumer 120 and scheduling service 140, but accessible by scheduling service 140. In another example, history 230 may be located at service provider 130 and accessible by scheduling service 140. In another example, history 230 may be located in a healthcare management system or accessible by a healthcare management system, which in turn may make history 230 available to scheduling service 140.

In some embodiments, scheduling service 140 may access and utilize preferences 240. Preferences 240 may be designated for providers and/or consumers. Consumer preferences 240 may include methods of communication regarding schedule notification. For example, a consumer may request an appointment and prefer that scheduling service 140 send notification of the appointment via email. Consumer preferences may also include preferred days and times for appointments. Other preferences have been contemplated. Providers may also have preferences stored in preference data store 240. Provider preferences 240 may include days and times for appointment availability. Provider preferences may also include preferred methods of notification for appointments and required methods of communication. For example, service provider 130 may utilize a specific scheduling system, which scheduling service 140 must utilize via a specific calendaring API or communications technology. The definition of this communications technology may be defined as a preference in the preferences data store 240. Preferences may be stored on a computer accessible medium in a digital format. Preferences may be stored as data in a relational database or as some other data implementation.

In some embodiments, scheduling service 140 may provide a method for service provider 130 and service consumer 120 to update preferences data 240 either through the presentation of web pages, web service calls or some other method. Preferences 240 may be unique to specific providers and consumers. For example, provider A may have the same or different preferences than provider B. Further, consumer A may have the same or different preferences than consumer B. In some cases, provider preferences 240 may be located locally on service provider system 130 and accessible by scheduling service 140. In other cases, provider preferences 240 may be located on a network server and accessible by scheduling service 140. In one embodiment, provider preferences may be located on scheduling system 140. In another embodiment, provider preferences 240 may be accessible by scheduling system 140, through accessing a health care management system. In one embodiment, consumer preferences 240 may be located locally on service consumer 120 and sent to scheduling system 140 with the initial schedule request. In another embodiment, consumer preferences 240 may be stored on a network server accessible by scheduling service 140. In another embodiment, consumer preferences 240 may be stored on scheduling service 140. In another embodiment, consumer preferences 240 may be accessed by scheduling service 140 from a health care management system.

In some embodiments, rules engine 141, as part of scheduling service 140, may utilize a set of rules 250 during the processing of a priority-based schedule. In some cases, rules may be configured by service providers 130. Each provider may have their own set of rules 250. Rules 250 may be used as part of the process of assigning a priority to a schedule request. Further, rules 250 may dictate when consumer appointments are scheduled with service provider 130, dependent on an assigned priority. For example, a health care provider may have rules 250 that assign a priority value to a consumer's reason for a schedule request, with the notion that each schedule request is associated with a patient 120 that has a certain condition. In one example, a rule 250 may dictate that a patient, classified as a diabetic, requesting an appointment for low blood sugar, is assigned priority A and another rule 250 may dictate that a another patient, requesting an annual physical, is assigned priority B. Another rule 250 may dictate that a patient with a priority A request may receive an appointment sooner than a patient with the priority B request.

In some cases, rules 250 may be located locally on service provider 130 and accessible by scheduling service 140. In other cases, rules 250 may be located on a network server, accessible by scheduling service 140. In some cases, rules 250 may be located on health care management system, accessible by scheduling service 140. In some embodiments, rules 250 may be located on scheduling service 140.

Rules may be stored as data in a relational database or some other digital data format stored on computer accessible media. For example, rules 250 may be stored formatted in eXtensible Markup Language (XML). Alternatively, rules may be stored as program instructions implemented in a logic programming language (e.g. Prolog), procedural programming language (e.g., C, C++), or object oriented programming language (e.g., Java, C#) or some other programming or scripting language executable on a computer system.

Figure 3:
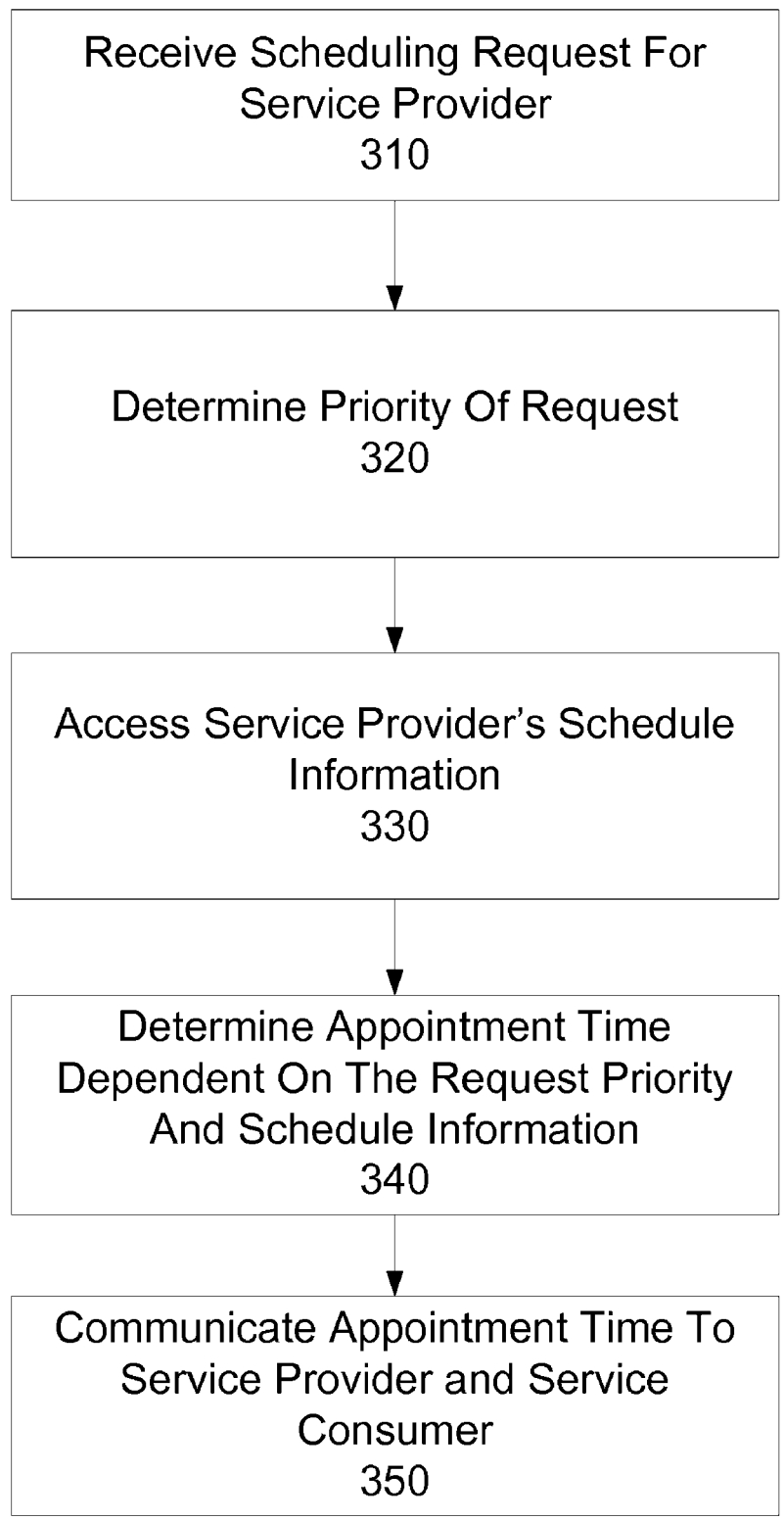
FIG. 3 is a flow diagram illustrating a method for priority-based scheduling, according to an embodiment.

FIG. 3 is a flow diagram illustrating a method for priority-based scheduling, according to an embodiment. As shown in block 310 of FIG. 3, scheduling service 140 may be configured to receive a schedule request. The request may originate from service consumer 120. In some cases the schedule request may originate from service provider 130 on behalf of service consumer 120. The schedule request may identify the consumer making the request and the provider for whom the appointment is to be scheduled. The schedule request may include a reason for the schedule request and may include a preferred day and time for the appointment. The reason for the request may indicate a consumer's condition. Other information may be included in the service request.

As shown in block 320 of FIG. 3, scheduling service 140 may be configured to determine the priority of the request. In some embodiments, scheduling service 140 may access and apply one or more rules 240 during the determination of priority. For example, one or more rules 240 may be applied to the reason for the schedule request. Some reasons for schedule requests are more urgent than others and the application of rules 240 may dictate an early appointment schedule for urgent schedule requests. Alternatively, some reasons for schedule requests are less urgent and rules 240 may dictate a later appointment schedule. Scheduling service 140 may access history 230 and apply one or more rules to history information 230. For example, in the case of a patient requesting an appointment with a health care provider, rules may determine the patient with a history of serious illness receive a high priority, and therefore is scheduled earlier than some other patient with a history of good health.

Block 330 in FIG. 3 shows scheduling service 140 accessing service provider 130 schedule information. Service provider 130 schedule information may indicate appointment availability, existing appointment schedule information and the priority of existing appointments. Other data may be included in service provider 130 schedule information.

Scheduling service 140 may utilize any of several different methods of accessing service provider 130 schedule information. Different service providers 130 may require different access methods. In some embodiments, the preferred method for access may be defined in preferences data store 240. Scheduling service 140 may access service provider 130 schedule information via network 110. In some embodiments, scheduling service 140 may access service provider 130 schedule information by utilizing an API designated for service provider 130 schedule information system. In various embodiments, scheduling service 140 may access service provider 130 scheduling information by calling a web service utilizing hypertext transfer protocol (HTTP) or simple object access protocol (SOAP) or some other protocol for network communication. Schedule information may be exchanged between scheduling service 140 and service provider 130 utilizing eXtensible markup language (XML) or some other format readable by scheduling service 140. In some embodiments, scheduling service 140 may utilize standard protocols for exchanging calendar and schedule information with service provider 130. Examples include iCalendar, the iCalendar Message-based Interoperability Protocol (iMIP), SyncML or some other calendar information exchange protocol. In other embodiments, scheduling service 140 may utilize other protocols and technologies to exchange email and calendar information with service provider 130, for example Microsoft Exchange™.

Block 340 in FIG. 3 shows scheduling service 140 determining the appointment time dependent upon request priority and schedule information. Scheduling service 140 may utilize several inputs during the determination an appointment time. As mentioned above, to determine the appointment time, scheduling service 140 may utilize the prioritized schedule request, current service provider 130 schedule information, preference information 240 and rules 250. In some cases, service provider 130 schedule information includes open time slots and scheduled time slots. In one embodiment, scheduling service 140 may schedule an appointment for the first available time slot for a determined priority. In another embodiment, a schedule request with a very high priority (e.g. emergency) may initiate scheduling service 140 to schedule an appointment in a time slot that has already been schedule for someone else. In this case, scheduling service 140 may reschedule the appointment with the lower priority for another time. See, e.g., the description for FIG. 4.

Block 350 in FIG. 3 shows scheduling service 140 communicating the appointment time to service provider 130 and service consumer 120. In some embodiments, the methods of communication may be determined by preferences 240. Preferences 240 may indicate a preferred device and communication channel. In some embodiments a message indicating the schedule information may be sent by email, text message or a voice message to a telephone. In other embodiments, schedule information may be inserted into the service provider 130 and/or service consumer 120 schedule information by communicating with their scheduling system. The scheduling service 140 may accomplish this by utilizing a calendar API or some other calendar data exchange protocol accessible via network 110.

Figure 4:
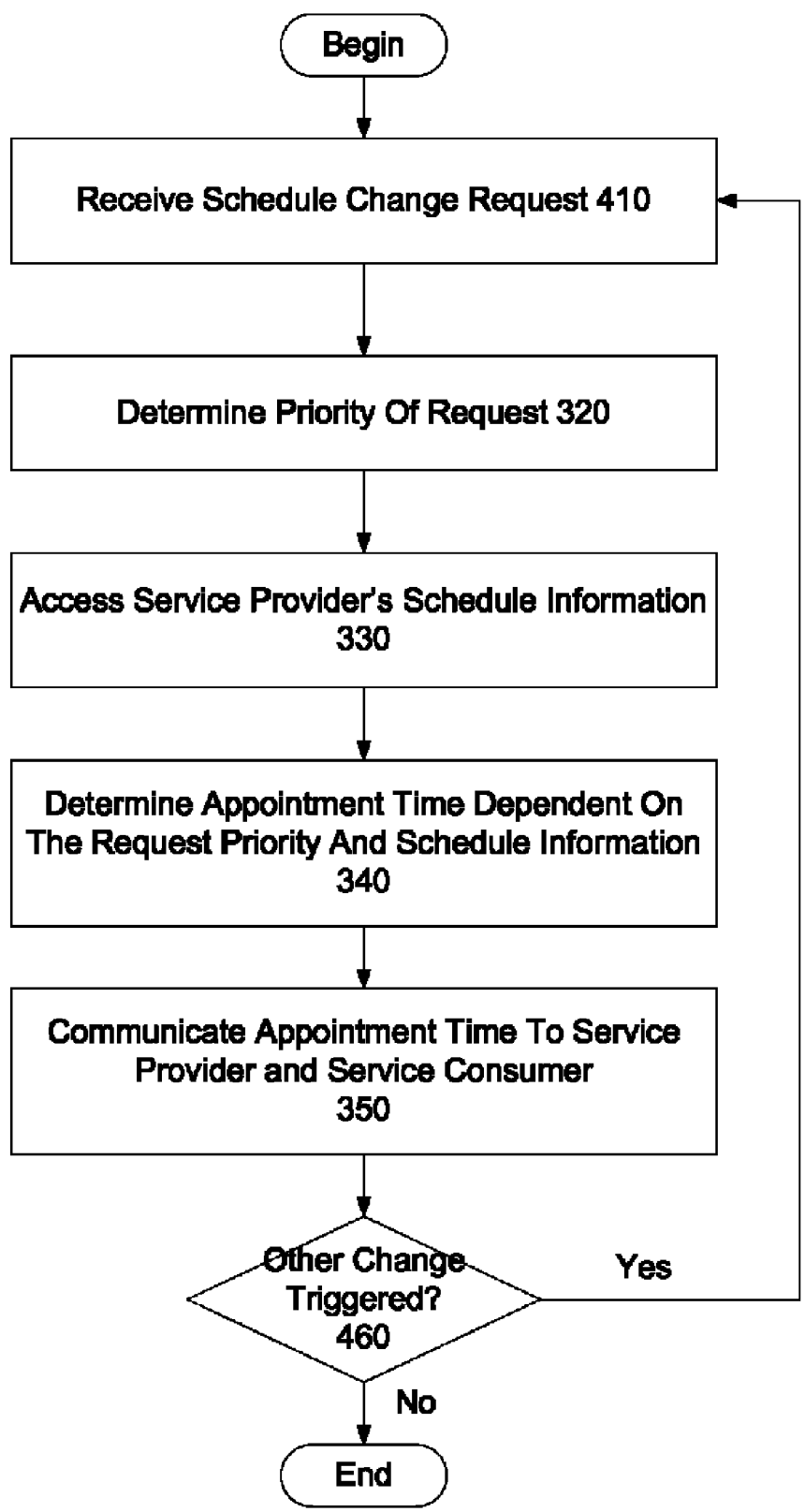
FIG. 4 is a flow diagram illustrating a method for a priority-based schedule change, according to an embodiment.

FIG. 4 is a flow diagram illustrating a method for a priority-based schedule change, according to one embodiment. In some cases, schedule change requests may be initiated by service consumer 120 or service provider 130. In one example, a health care provider may have an emergency situation that causes him or her to change the appointments of existing patients. In another example, a consumer may need to change an existing appointment to another time for a variety of reasons. As shown in block 410, scheduling service 140 receives a schedule change request. In block 320, scheduling service 140 determines the priority of the request based on information contained in the schedule change request.

As shown in block 330, scheduling service 140 accesses service provider 130 current schedule information and as shown in block 340, scheduling service 140 determines a new appointment time dependent on the request priority and the schedule information. Block 350 shows scheduling service 140 communicating the new appointment time to service consumer 120 and service provider 130. (See descriptions of blocks 320, 330, 340 and 350 above in the FIG. 3 description.) If the appointment change was to an available time slot, the process ends at 460. However, as shown in block 460, the schedule change may trigger the change of another appointment. For example, a schedule request with a high priority may trigger the change of an appointment with a low priority to a later time. In this case, the consumer whose appointment changed may need a new appointment and the flow goes back to block 410 to initiate a new scheduling workflow.

Figure 5:
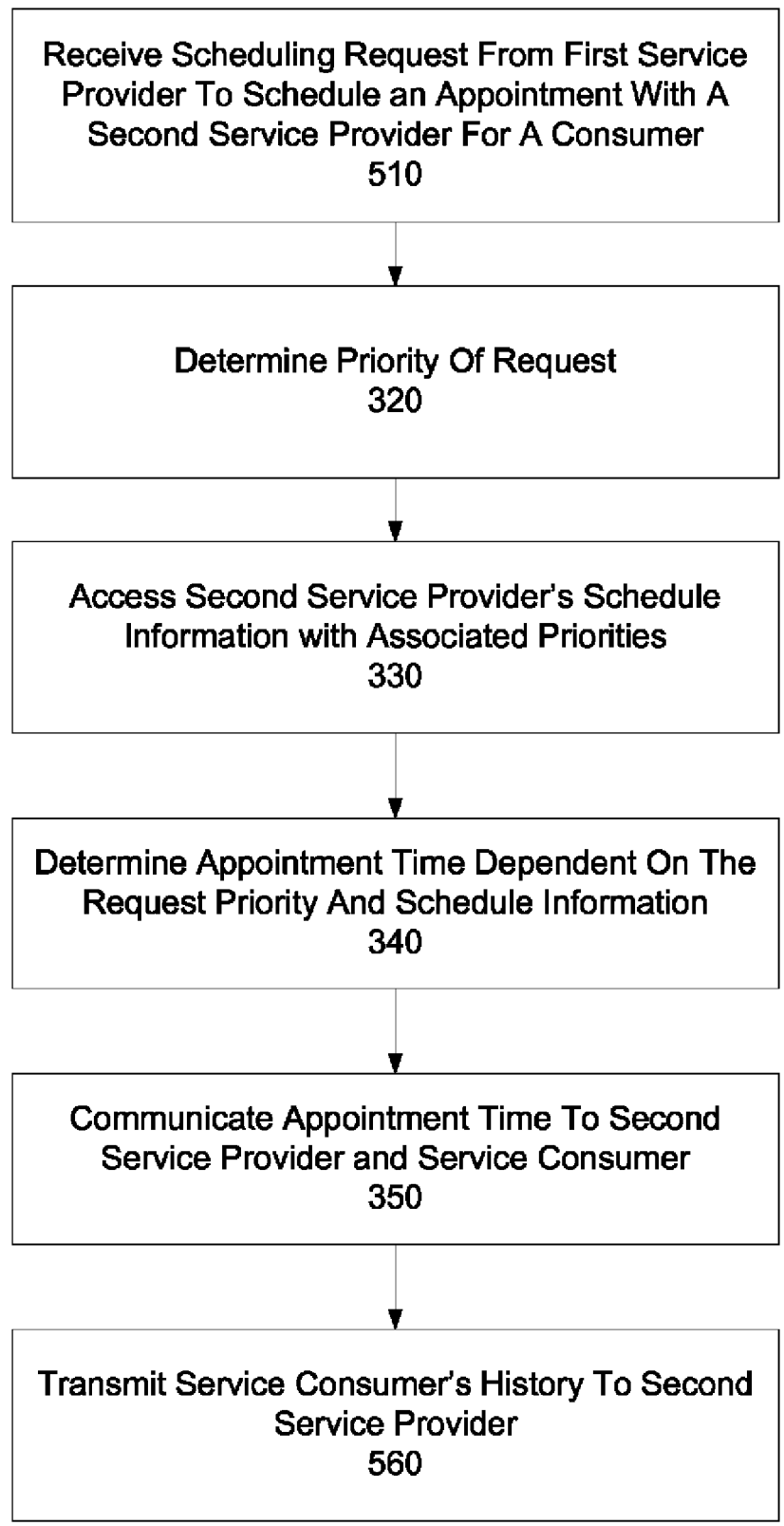
FIG. 5 is a flow diagram illustrating a method for priority-based scheduling, where one service provider schedules an appointment for a service consumer with another service provider, according to an embodiment.

FIG. 5 is a flow diagram illustrating a method for priority-based scheduling, where one service provider 130A schedules an appointment for a consumer with another service provider 130B, according to an embodiment. In one example, a provider may have a last minute emergency and may not able to attend an appointment with a consumer who has an appointment. Service provider 130A may initiate a new schedule request to schedule the consumer with another service provider 130B where service provider 130B is available for the given time. In another example, service provider 130A may be a health care provider and service consumer 120 may be a patient. The health care provider may diagnose the patient with a condition that requires an appointment with a specialist and the health care provider may initiate a schedule request on behalf of the patient with the specialist.

Block 510 of FIG. 5 shows scheduling service 140 receiving a schedule request from a first service provider 130A to schedule an appointment with a second service provider 130B for service consumer 120. In some embodiments, the schedule request identifies service provider 130A, service provider 130B and service consumer 120 and includes a reason for the request. Block 320 shows the scheduling service determining the priority of the request. (See description of block 320 above in the description of FIG. 3.) Block 330 shows scheduling service 140 accessing the second service provider 130B schedule information with associated priorities. (See description of block 330 above in the description of FIG. 3.) Block 340 shows the scheduling service determining the appointment time dependent on the request priority and schedule information. (See description of block 340 above in the description of FIG. 3.) Block 350 shows the scheduling service communicating the appointment time to the second service provider and the service consumer. (See description of block 350 above in the description of FIG. 3.) Block 560 shows the scheduling service transmitting the consumer's history 230 to the second service provider 130A. For example, the consumer (service consumer 120) may be a patient and the provider (service provider 130B) may be a health care provider that has never seen the consumer. In this case, scheduling service 140 may send the consumer's history 230 to healthcare provider 130B. In some embodiments, history 230 may be sent via network 110 utilizing a secure protocol such as Secure Hyper Text Transfer Protocol (HTTPS) or some other secure method of communication protocol over network 110. In another embodiment, history 230 may be encrypted and sent by email to service provider 130B by email.

Figure 6:
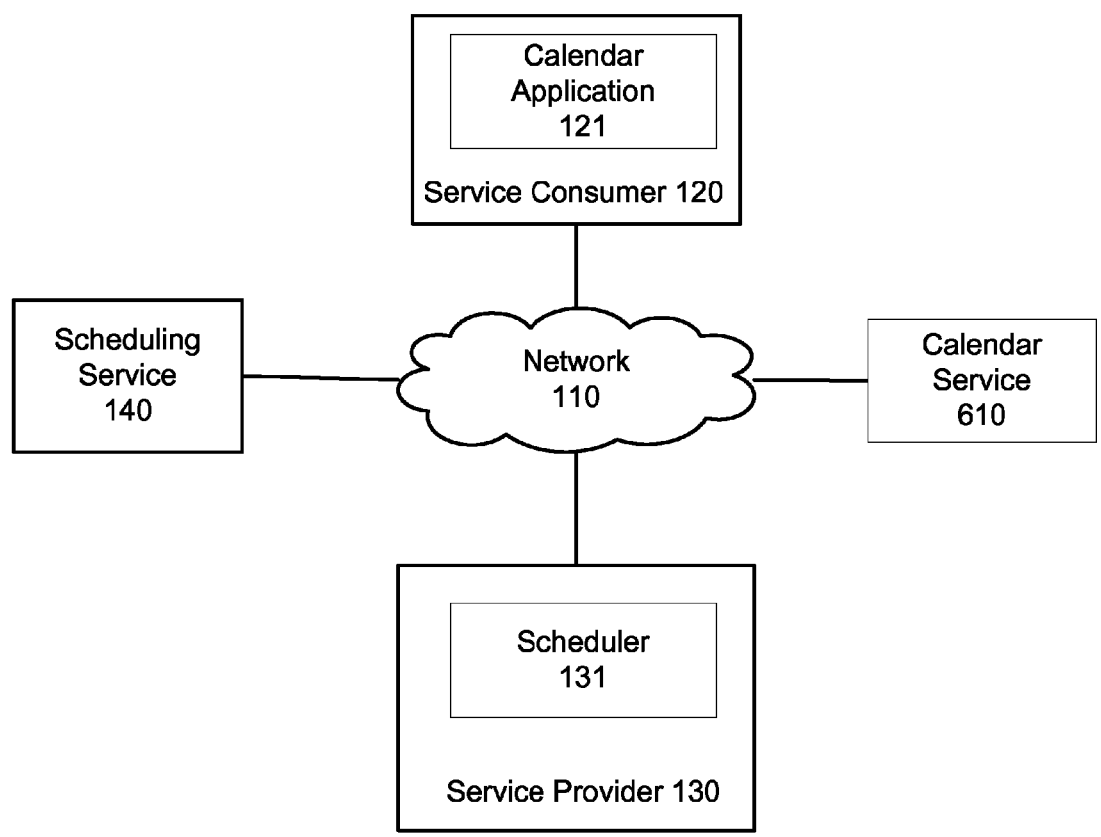
FIG. 6 is a block diagram that illustrates a system including a scheduling service coupled to a network and various service providers with scheduler applications and consumers with calendar applications, according to an embodiment.

FIG. 6 is a block diagram that illustrates a system including a scheduling service coupled to a network and various service providers with scheduler applications and consumers with calendar applications, according to an embodiment. Block 140 shows a scheduling service connected to network 110. In some embodiments, scheduling service 140 has access to service provider system 130 and appointment scheduler 131. Scheduler 131 is a system, application or service configured to schedule appointments for service provider 130 and includes a data store of schedule information. Scheduling service 140 is configured to exchange data with scheduler 131 via network 110. In some embodiments, scheduling service 140 may connect to scheduler 131 and may view, add, remove and change schedule information on scheduler 131. In some embodiments, service provider 130 may utilize a network based appointment scheduling or calendar service 610. In some embodiments, scheduling service 140 may access service 610 utilized by service provider 130 and view, add, change and remove schedule information. Service consumer 120 may utilize calendar application 121 to manage schedule information. Application 121 has a data store of consumer schedule information. In some embodiments, scheduling service 140 may access service consumer 120 calendar application 121 in order to view, add, remove and change schedule information. In other cases, service consumer 120 may utilize calendar service 610 to manage schedule information. In some embodiments, scheduling service 140 may connect to and access service consumer 120 calendar service 610 to view, add, change and remove schedule information via network 110. Examples of network based calendar application 610 are calendar applications from Google™ or Yahoo™. Scheduling service 140 may communicate with the network based calendar application using an API such as the Google™ Calendar API or another API.

Figure 7:
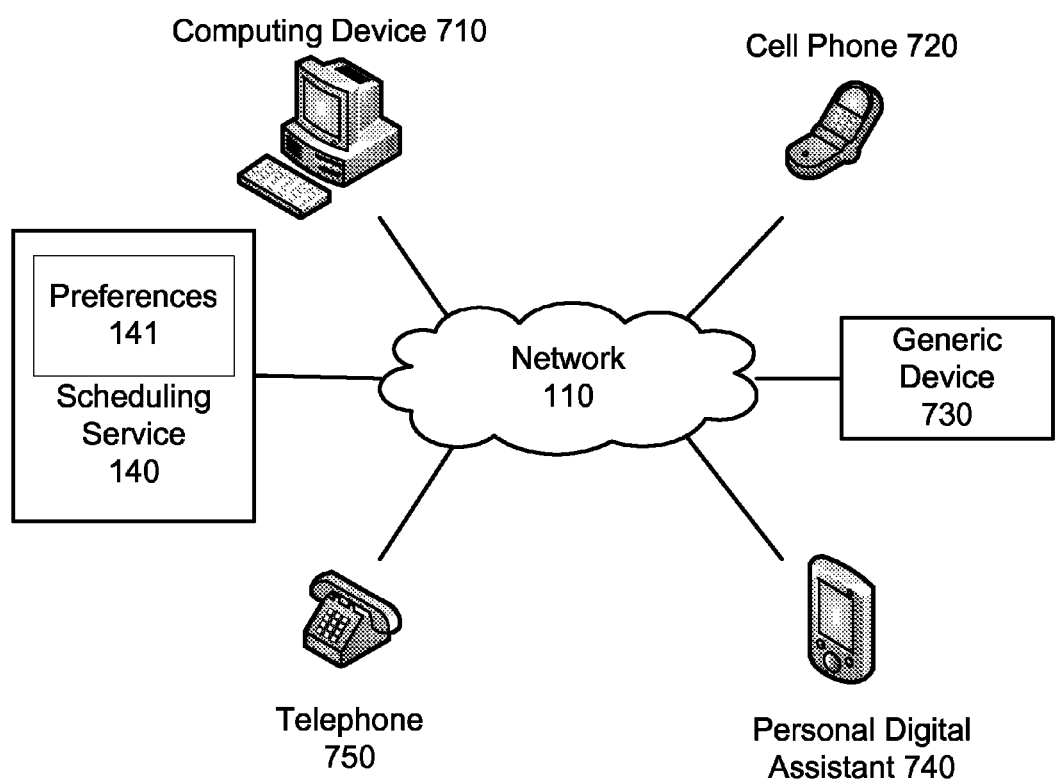
FIG. 7 is a block diagram illustrating various devices that can be utilized by consumers and providers.

FIG. 7 is a block diagram illustrating various devices that may be utilized by consumers and providers. In some embodiments, service consumer 120 and service provider 130 may utilize cell phones 720, personal digital assistants 740, computing devices 710 and other generic devices 730 with interfaces tailored to the specific device, which can connect to and exchange data via network 110. These devices may be used to both schedule priority-based appointments and receive notification of scheduled appointment. In some embodiments service consumer 120 may be implemented as a telephone 750 used to dial into a voice response system configured to allow service consumer 120 to initiate a schedule request and receive notification of the appointment utilizing a telecommunications/telephone network, such as an analog network. In other embodiments, service consumer 120 may use a telephone 750 equipped to utilize Voice Over IP (VOIP) in a similar fashion to dial into a voice response system. Network 110 may be configured to allow data to be exchanged between scheduling service 140 and other devices attached to a network, such as other computer systems, or between nodes of computer systems 140. In various embodiments, network interface 110 may support communications via wired or wireless general data networks, including the Internet, WANs, LANs and/or combinations thereof; via telecommunications/telephone networks such as analog voice networks or digital fiber communications networks; via storage area networks such as Fibre Channel SANs, or via any other suitable type of network and/or protocol. The input/output devices shown in FIG. 7 may, in some cases, include one or more display terminals, keyboards, keypads, touchpads, scanning devices, voice or optical recognition devices, or any other devices suitable for entering or retrieving data. Multiple input/output devices may be present.

Figure 8:
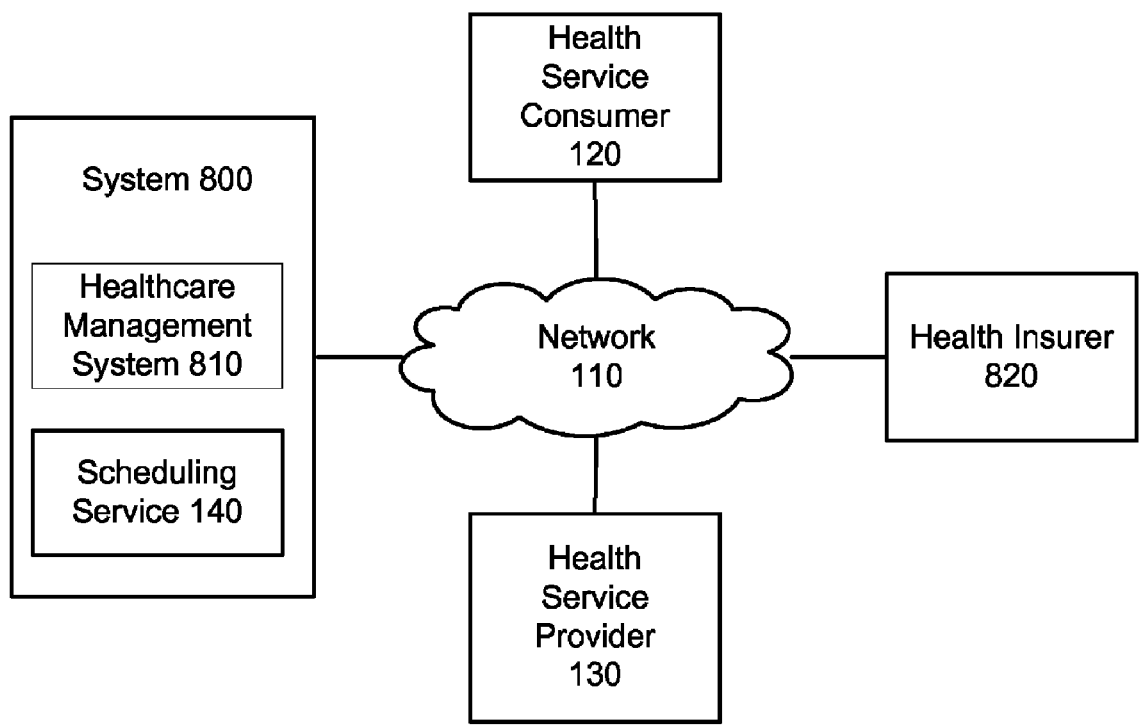
FIG. 8 is a block diagram illustrating a healthcare management system, coupled with a scheduling service connected to service providers, service consumers and health insurers via a network, according to an embodiment.

FIG. 8 is a block diagram illustrating a healthcare management system 810, coupled with a scheduling service 140 connected to service provider 130, service consumer 120 and health insurer 820 via a network 110, according to an embodiment. In some embodiments, the scheduling service 140 described herein may be configured to interact with a healthcare management application 810. In some embodiments, the scheduling service 140 described herein may be a component of the healthcare management application 810. Healthcare management application 810 may in some cases provide a consumer with a framework and tools for collecting, organizing, and managing data related to their health history; past, current and future health services; health insurance plan(s) (e.g., what services are covered, coverage limits, claims status, and explanations of benefits); and finances related to healthcare (e.g., health insurance premiums, deductibles, co-payments, benefit payments, reimbursements from FSAs, HRAs, or health savings accounts, maximum out-of-pocket expenses, and maximum lifetime benefits.) For example, a healthcare management application 810 may be configured to provide a consumer with a comprehensive and detailed health history, or may allow the consumer to extract and/or analyze his or her data regarding a particular health condition or event (e.g., an injury or illness) or a particular healthcare-related service (e.g., a particular diagnostic exam or a course of treatment for a chronic condition.)

A healthcare management application 810 may in some embodiments be implemented as a web-based service to which consumers and/or employers may subscribe. In other embodiments, it may be implemented as a stand-alone application, such as one installed and executed on a desktop computer by a consumer. In some embodiments, a healthcare management application 810 may include both a locally installed application (i.e., a client portion) and a remote, web-based application (i.e., a server portion). For example, in one embodiment, a consumer may enter healthcare-related information on a locally installed client application and then may upload the information to a healthcare management service server 800 for secure storage and/or further analysis.

In various embodiments, a healthcare management application 810 may receive information from one or more of: a consumer, one or more healthcare providers, one or more health plan administrators (e.g., health insurance representatives), and one or more financial institutions. The information received and/or managed by a healthcare management application 810 may be formatted according to a standard data exchange format, in some embodiments.

A healthcare management application 810 may in some embodiments maintain healthcare-related information in one or more databases (or in other suitable formats) in a local or remote memory, or in a combination of the two. For example, a database located on a healthcare management service server 800 may be configured to securely store healthcare-related information for multiple individual consumers or for employees of one or more corporations subscribing to the healthcare management service, while a database stored locally on a consumer's computing system may include only his or her own personal healthcare-related data.

The information managed by a healthcare management application 810 may in some embodiments be extracted for use by other applications, such as the scheduling service 140 described herein. For example, healthcare management system may share patient health history 230, rules 250 and/or preferences 240 with scheduling service 140.

Similarly, information may be extracted from other applications for management, organization, and/or analysis by a healthcare management application 810. For example, scheduling service 140 may share schedule information, patient health history 230, preferences 240 and/or rules 250 with healthcare management application 810.

Figure 9:
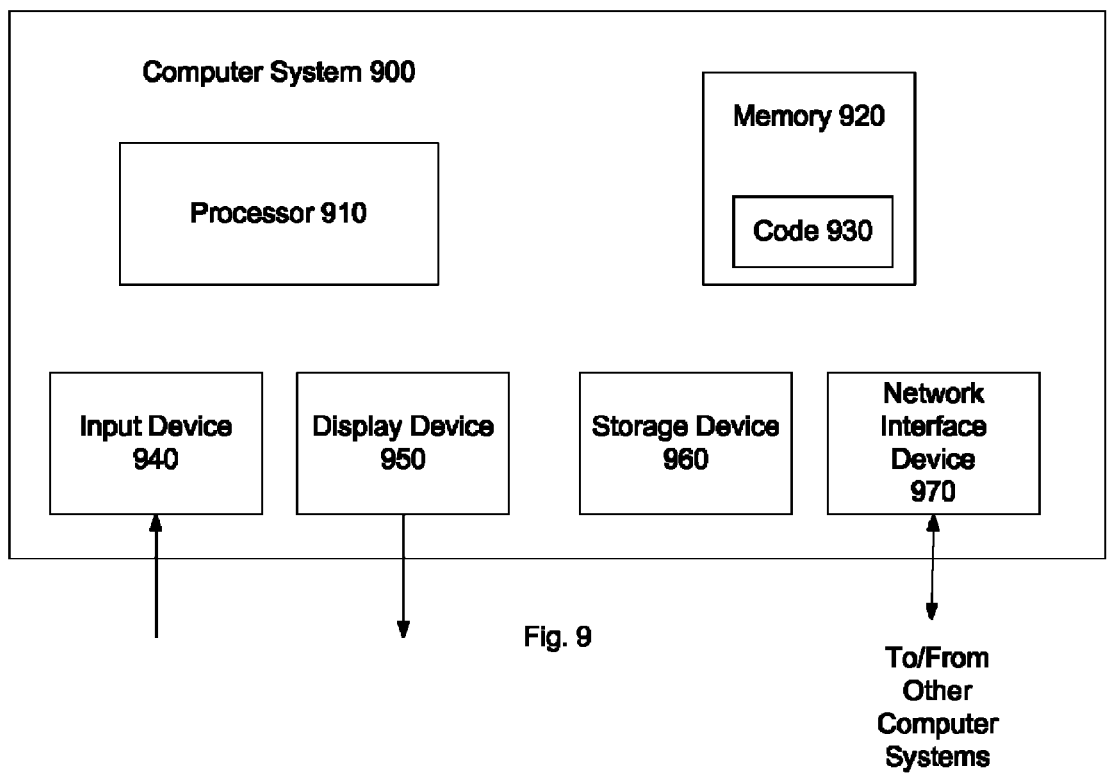
FIG. 9 is a block diagram illustrating a computing device, according to an embodiment.

FIG. 9 is a block diagram illustrating a computing device, according to an embodiment. Various components of embodiments of the priority-based appointment scheduling system, consumer systems, provider systems, appointment or calendar systems, communication devices, healthcare management system, etc., as described herein, may be executed on one or more computer systems, which may interact with various other devices. One such computer system is illustrated by FIG. 9. In the illustrated embodiment, computer system 900 includes one or more processors 910 coupled to a system memory 920. Computer system 900 further includes a network interface 970 and one or more input/output devices 940/950, such as a cursor control device, keyboard, audio device and display device 950. In some embodiments, it is contemplated that embodiments may be implemented using a single instance of computer system 900, while in other embodiments multiple such systems, or multiple nodes making up computer system 900, may be configured to host different portions or instances of embodiments. For example, in one embodiment some elements may be implemented via one or more nodes of computer system 900 that are distinct from those nodes implementing other elements.

In various embodiments, computer system 900 may be a uniprocessor system including one processor 910, or a multiprocessor system including several processors 910 (e.g., two, four, eight, or another suitable number). Processors 910 may be any suitable processor capable of executing instructions. For example, in various embodiments, processors 910 may be general-purpose or embedded processors implementing any of a variety of instruction set architectures (ISAs), such as the x86, PowerPC, Scalable Processor Architecture (SPARC), or Million Instructions per Second (MIPS) Instruction Set Architectures (ISAs), or any other suitable ISA. In multiprocessor systems, each of processors 910 may commonly, but not necessarily, implement the same ISA.

System memory 920 may be configured to store program instructions 930 and/or data accessible by processor 910. In various embodiments, system memory 920 may be implemented using any suitable memory technology, such as static random access memory (SRAM), synchronous dynamic RAM (SDRAM), nonvolatile/Flash-type memory, or any other type of memory. Program instructions and/or data may also be stored, for example, on a hard disk. In the illustrated embodiment, program instructions and data implementing desired functions, such as those described above for the priority-based appointment scheduling system, are shown stored within system memory 920 as program instructions 930 and data storage 960, respectively. In other embodiments, program instructions and/or data may be received, sent or stored upon different types of computer-accessible media or on similar media separate from system memory 920 or computer system 900. Generally speaking, a computer-accessible medium may include storage media or memory media such as magnetic or optical media, e.g., disk or Digital Versatile Disc (DVD) Read Only Memory (ROM)/Compact Disk-Read Only Memory (CD-ROM) coupled to computer system 900. Program instructions and data stored via a computer-accessible medium may be transmitted by transmission media or signals such as electrical, electromagnetic, or digital signals, which may be provided via a communication medium such as a network and/or a wireless link, such as may be implemented via network interface 970.

Network interface 970 may be configured to allow data to be exchanged between computer system 900 and other devices attached to a network, such as other computer systems, or between nodes of computer system 900. In various embodiments, network interface 970 may support communication via wired or wireless general data networks, such as any suitable type of Ethernet network, for example; via telecommunications/telephony networks such as analog voice networks or digital fiber communications networks; via storage area networks such as Fibre Channel Storage Area Networks (SANs), or via any other suitable type of network and/or protocol.

Input/output devices 940 and 950 respectively, may in some embodiments include one or more display terminals, keyboards, keypads, touchpads, scanning devices, voice or optical recognition devices, or any other devices suitable for entering or retrieving data by one or more computer system 900. Multiple input/output devices 940 and 950 may be present in computer system 900 or may be distributed on various nodes of computer system 900. In some embodiments, similar input/output devices may be separate from computer system 900 and may interact with one or more nodes of computer system 900 through a wired or wireless connection, such as over network interface 970.

Memory 920 may include program instructions 930, configured to implement at least a portion of embodiments of the priority-based appointment scheduling system as described herein, and data storage 960, comprising various documents, tables, databases, etc. accessible by program instructions 930. In one embodiment, program instructions 930 may include software elements of the priority-based appointment scheduling system illustrated in the Figures, and data storage 960 may include data used in embodiments of the priority-based appointment scheduling system. In other embodiments, different software elements and data may be included. Program instructions and/or data may be stored, for example, on various types of memory including hard disks.

Those skilled in the art will appreciate that computer system 900 is merely illustrative and is not intended to limit the scope of the priority-based appointment scheduling system as described herein. In particular, the computer system and devices may include any combination of hardware or software that can perform the indicated functions, including computers, network devices, internet appliances, PDAs, mobile phones, pagers, etc. Computer system 900 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 900 may be transmitted to computer system 900 via transmission media or signals such as electrical, electromagnetic, or digital signals, provided via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. Synchronous Dynamic RAM (SDRAM), Double Data Rate RAM (DDR RAM), RAMBUS Dynamic RAM (RDRAM), Static RAM (SRAM), etc.), Read Only Memory (ROM), etc. as well as transmission media or signals such as electrical, electromagnetic, or digital signals, provided via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
one or more processors;
a memory coupled to the one or more processors, wherein the memory stores program instructions executable by the one or more processors to implement a scheduling service configured to:
receive scheduling requests for a plurality of service providers, wherein each of the scheduling requests identifies one of the plurality of service providers and a service consumer, and wherein each of the scheduling requests includes information for evaluating a priority of the scheduling request;
for each of the scheduling requests:
access schedule information for the identified service provider, wherein the schedule information indicates time information and priority information for existing appointments;
determine an appointment time for the scheduling request dependent on a priority of the scheduling request and dependent on said time information and said priority information for said existing appointments wherein to determine the appointment time the scheduling service is configured to access service history information for the identified service consumer, and determine the priority of the scheduling request dependent on the service history information for the identified service consumer and dependent on said information for evaluating the original priority from the scheduling request, wherein the service history information comprises information relating to historical health history, medical conditions, medical tests, and medical referrals of a consumer; and
communicate the appointment time to a device for the identified service provider and to a device for the identified service consumer.

2. The system as recited in claim 1, wherein to determine said appointment time, the scheduling service is configured to access scheduling preference information for the identified service provider, wherein the appointment time is determined further dependent on said scheduling preference information for the identified service provider.

3. The system as recited in claim 1, wherein to determine said appointment time, the scheduling service is configured to access scheduling preference information for the identified service consumer, wherein the appointment time is determined further dependent on said scheduling preference information for the identified service consumer.

4. The system as recited in claim 1, wherein one of the scheduling requests is received from the device for the service provider identified in the one of the scheduling requests.

5. The system as recited in claim 1, wherein one of the scheduling requests is received from the device for the service consumer identified in the scheduling request.

6. The system as recited in claim 1, wherein for one of the plurality of the scheduling requests, to determine an appointment time for the scheduling request, the scheduling service is configured to change an appointment time for one or more existing appointments of the identified service provider, and wherein the scheduling service is configured to communicate a corresponding changed appointment time to a device for a service consumer identified for each changed appointment time.

7. The system as recited in claim 1, wherein one of the scheduling requests is received from a device for another service provider different from the service provider identified in the one of the scheduling requests.

8. The system as recited in claim 7, wherein the another service provider and the service provider identified in the one of the scheduling requests are healthcare providers, and wherein the scheduling service is configured to transmit a personnel health history for the identified service consumer to the service provider identified in the one of the scheduling requests.

9. The system as recited in claim 1, wherein to access the scheduling information and communicate the appointment time, the scheduling service is configured to connect to a scheduling system for the identified service provider.

10. The system as recited in claim 1, wherein the scheduling service is further configured to determine the appointment time dependent on schedule information for the identified service consumer.

11. The system as recited in claim 10, wherein the scheduling service is configured to access the schedule information for the identified service consumer from a calendar application for the identified service consumer.

12. The system as recited in claim 1, wherein the information for evaluating a priority of the scheduling request comprises one or more of: a priority rating assigned by the identified service provider, a diagnosis, a condition description, and an urgency rating assigned by the service consumer.

13. The system as recited in claim 1, wherein to communicate the appointment time to a device for the identified service provider or to a device for the identified service consumer, the scheduling service is configured to communicate the appointment time via a communication channel according to one or more of electronic mail, instant messaging, text messaging, calendar service, and voice communication; wherein the scheduling service is configured to select the communication channel according to a preference setting for the identified service provider or identified service consumer.

14. The system as recited in claim 1, wherein the scheduling service comprises a rules engine configured to evaluate the priority of the scheduling request and determine the appointment time according to a set of rules, wherein the set of rules are at least partially configured by the identified service provider.

15. The system as recited in claim 1, wherein the scheduling service is a component of a healthcare management service accessible over a network, wherein the healthcare management service is configured to interface with a plurality of healthcare providers, healthcare consumers, and healthcare insurers.

16. A computer-accessible storage medium, comprising program instructions, wherein the program instructions are computer-executable to implement a scheduling service configured to:
   receive scheduling requests for a plurality of service providers, wherein each of the scheduling requests identifies one of the plurality of service providers and a service consumer, and wherein each of the scheduling requests includes information for evaluating a priority of the scheduling request;
   for each of the scheduling requests:
      access schedule information for the identified service provider, wherein the schedule information indicates time information and priority information for existing appointments;
      determine an appointment time for the scheduling request dependent on a priority of the scheduling request and dependent on said time information and said priority information for said existing appointments, wherein to determine the appointment time the scheduling service is configured to access service history information for the identified service consumer, and determine the priority of the scheduling request dependent on the service history information for the identified service consumer and dependent on said information for evaluating the original priority from the scheduling request, wherein the service history information comprises information relating to historical health history, medical conditions, medical tests, and medical referrals of a consumer; and
      communicate the appointment time to a device for the identified service provider and to a device for the identified service consumer.

17. The computer-accessible storage medium as recited in claim 16, wherein to determine said appointment time, the scheduling service is configured to access scheduling preference information for the identified service provider, wherein the appointment time is determined further dependent on said scheduling preference information for the identified service provider.

18. The computer-accessible storage medium as recited in claim 16, wherein to determine said appointment time, the scheduling service is configured to access scheduling preference information for the identified service consumer, wherein the appointment time is determined further dependent on said scheduling preference information for the identified service consumer.

19. The computer-accessible storage medium as recited in claim 16, wherein one of the scheduling requests is received from the device for the service provider identified in the one of the scheduling requests.

20. The computer-accessible storage medium as recited in claim 16, wherein one of the scheduling requests is received from the device for the service consumer identified in the scheduling request.

21. The computer-accessible storage medium as recited in claim 16, wherein for one of the plurality of the scheduling requests, to determine an appointment time for the scheduling request, the scheduling service is configured to change an appointment time for one or more existing appointments of the identified service provider, and wherein the scheduling service is configured to communicate a corresponding changed appointment time to a device for a service consumer identified for each changed appointment time.

22. The computer-accessible storage medium as recited in claim 16, wherein one of the scheduling requests is received from a device for another service provider different from the service provider identified in the one of the scheduling requests.

23. The computer-accessible storage medium as recited in claim 22, wherein the another service provider and the service provider identified in the one of the scheduling requests are healthcare providers, and wherein the scheduling service is configured to transmit a personnel health history for the identified service consumer to the service provider identified in the one of the scheduling requests.

24. The computer-accessible storage medium as recited in claim 16, wherein to access the scheduling information and communicate the appointment time, the scheduling service is configured to connect to a scheduling system for the identified service provider.

25. The computer-accessible storage medium as recited in claim 16, wherein the scheduling service is further configured to determine the appointment time dependent on schedule information for the identified service consumer.

26. The computer-accessible storage medium as recited in claim 25, wherein the scheduling service is configured to access the schedule information for the identified service consumer from a calendar application for the identified service consumer.

27. The computer-accessible storage medium as recited in claim 16, wherein the information for evaluating a priority of the scheduling request comprises one or more of: a priority rating assigned by the identified service provider, a diagnosis, a condition description, and an urgency rating assigned by the service consumer.

28. The computer-accessible storage medium as recited in claim 16, wherein to communicate the appointment time to a device for the identified service provider or to a device for the identified service consumer, the scheduling service is configured to communicate the appointment time via a communication channel according to one or more of electronic mail, instant messaging, text messaging, calendar service, and voice communication; wherein the scheduling service is configured to select the communication channel according to a preference setting for the identified service provider or identified service consumer.

29. The computer-accessible storage medium as recited in claim 16, wherein the scheduling service comprises a rules engine configured to evaluate the priority of the scheduling request and determine the appointment time according to a set of rules, wherein the set of rules are at least partially configured by the identified service provider.

30. The computer-accessible storage medium as recited in claim 16, wherein the scheduling service is a component of a healthcare management service accessible over a network, wherein the healthcare management service is configured to interface with a plurality of healthcare providers, healthcare consumers, and healthcare insurers.

* * * * *